(No Model.)
O. F. BARBER.
HARROW.
No. 361,853. Patented Apr. 26, 1887.
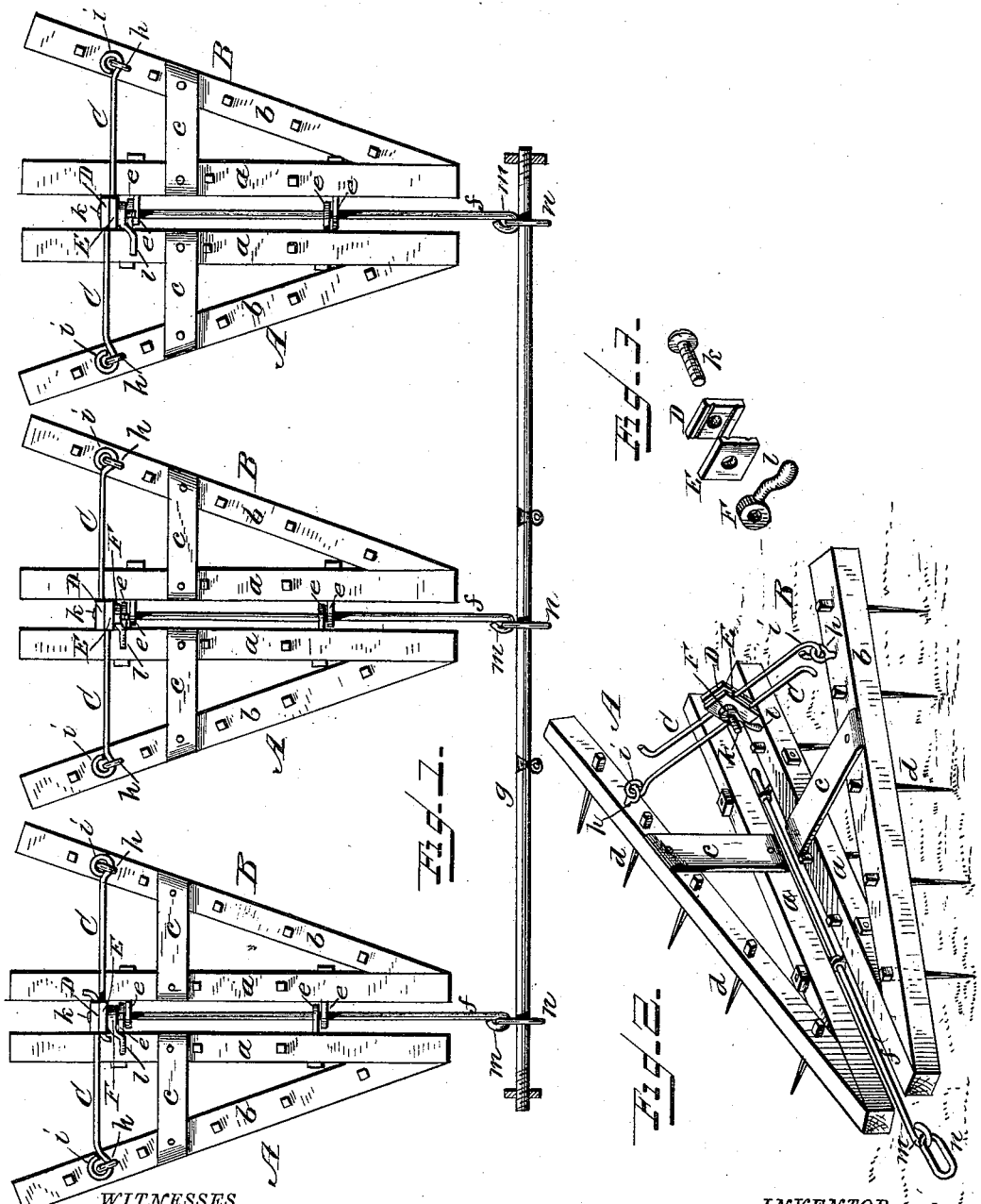
WITNESSES
F. L. Durand
L. L. Miller
INVENTOR
Orson F. Barber,
per Chas. H. Fowler
Attorney

United States Patent Office.

ORSON F. BARBER, OF BURR OAK, KANSAS.

HARROW.

SPECIFICATION forming part of Letters Patent No. 361,853, dated April 26, 1887.

Application filed February 10, 1886. Renewed March 30, 1887. Serial No. 233,052. (No model.)

*To all whom it may concern:*

Be it known that I, ORSON F. BARBER, a citizen of the United States, residing at Burr Oak, in the county of Jewell and State of Kansas, have invented certain new and useful Improvements in Harrows; and I do hereby declare that the following is a full, clear, and exact description of the same, reference being had to the annexed drawings, making a part of this specification, and to the letters and figures of reference marked thereon.

Figure 1 of the drawings is a top plan view of my invention; Fig. 2, a perspective view of the two folding harrow-sections, one of said sections being raised to an upright position. Fig. 3 is a perspective view in detail of the clamp.

The present invention has relation to certain new and useful improvements in harrows; and it consists in the details of construction, substantially as shown in the drawings, and hereinafter described and claimed.

In the accompanying drawings, A B represent the two sections of the harrow, each section consisting of the beams $a$ $b$ and cross-brace $c$, the beams $a$ being straight and parallel to each other, while the beams $b$ are at an acute angle to beams $a$, the two beams of each harrow-section having the usual teeth, $d$. The inner sides of the beams $a$ have eye-plates $e$, through which passes a connecting-rod, $f$, thereby bringing the two sections together. I employ two or more harrows, and the rods $f$ of each harrow have eyes $m$ at their forward ends, to which are connected links $n$, through which extends a transverse draft-bar, $g$.

By means of the eyes and links, as above described, a swivel-connection is made between the harrows and draft-bar, also admitting said harrows sliding laterally along the draft-bar, either to the right or left, as circumstances require.

The beams $b$, near their rear ends, have connected to them lifting-rods C by means of eyes $h$ and hooks $i$, formed on the ends of the rods.

The rods C are held between grooved clamping-plates D E, connected together by screw $k$, extending through holes in the plates, and engaging with a tightening screw-nut, F, provided with a handle, $l$, for turning it to loosen or bring the plates tighter against the rods.

The rods C are bent at their free ends to form handles, and when either one of the harrow-sections is desired to be elevated and held in an upright position, as shown in Fig. 2, the clamping-plates are loosened and the section elevated by means of the rods C, and is thus held by bringing the clamping-plates against the rods tight enough to prevent them from slipping.

It should be understood that the harrows are prevented from slipping off the ends of the rods by nuts engaging with the screw-threaded ends thereof, or by any other desirable and well-known means, and the draft-chains or single-trees are connected to the draft-bar at two points midway of its ends, whereby the line of draft of said bar will be in a straight line.

Having now fully described my invention, what I claim as new, and desire to secure by Letters Patent, is—

The combination, with a longitudinal draft-bar, links loosely passing over said bar, rods having eyes at their forward ends and connected to the links, of two or more harrows, each consisting of two sections hinged to the rods and provided with lifting-rods, grooved clamping-plates for securely holding the free ends of the lifting-rods together, a screw engaging with the plates, and a tightening screw-nut provided with a suitable handle for operating it, substantially as and for the purpose set forth.

In testimony that I claim the above I have hereunto subscribed my name in the presence of two witnesses.

ORSON F. BARBER.

Witnesses:
SAMUEL J. JAMES,
W. REEVES.